UNITED STATES PATENT OFFICE.

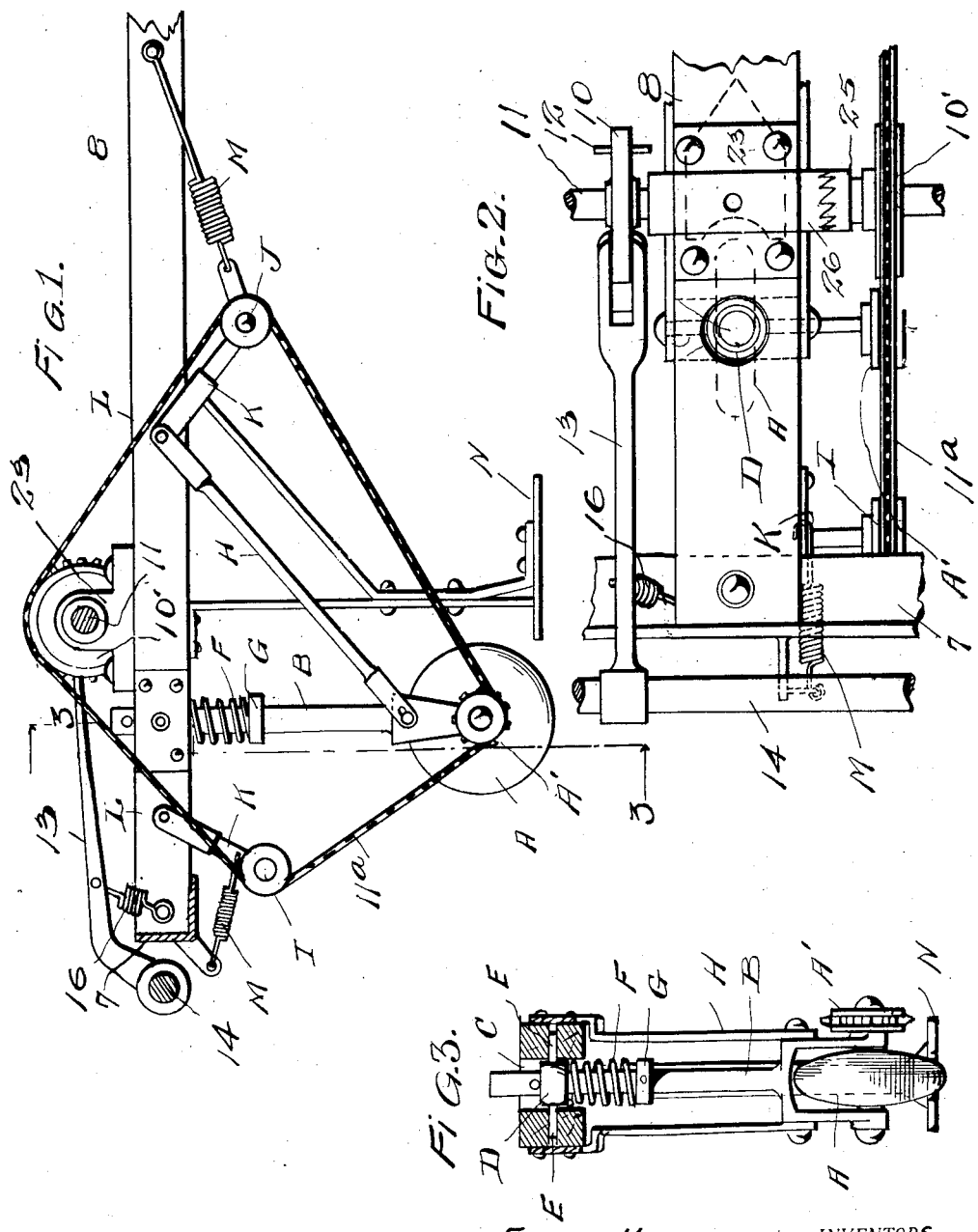

FRANK HEVEL, GROVER C. HARRINGTON, AND WILLIAM HEVEL, OF McCUNE, KANSAS.

CORN-PLANTER.

1,348,130.

Specification of Letters Patent.  Patented July 27, 1920.

Application filed April 1, 1919. Serial No. 286,786.

*To all whom it may concern:*

Be it known that we, FRANK HEVEL, GROVER C. HARRINGTON, and WILLIAM HEVEL, citizens of the United States, residing at McCune, in the county of Crawford and State of Kansas, have invented certain new and useful Improvements in Corn-Planters, of which the following is a specification.

Our present invention relates to improvements in corn planters, and is designed especially to simplify the construction and operation of implements of this character in several particulars.

The subject matter of this invention is the driving means for the checking device, and such means comprises a resiliently supported actuating or ground wheel, from which a suitable driving chain transmits motion to the checking and planting devices as will be pointed out hereinafter.

The implement utilizes an efficient and reliable guide to check a succeeding hill in line with the preceding hill planted, before the implement is turned around at the end of a row.

In the accompanying drawings we have illustrated one complete example of the physical embodiment of our invention constructed and arranged according to the best mode so far devised for the practical application of the principles of our invention.

Figure 1 is an enlarged, detail side elevation of the driving mechanism for the checking and planting device.

Fig. 2 is a top plan view of a portion of Fig. 1.

Fig. 3 is a sectional view at line 3—3 of Fig. 1.

In the preferred form of the invention as illustrated in the drawings we employ the usual standard type of corn planter having a supplemental frame 7 at the front of the implement to which the tongue 8 is rigidly attached, and the supplemental frame is pivoted to the main frame as usual so that planting of corn may be accomplished to best advantage.

The planting mechanism is actuated through the medium of a tappet wheel 10 on the countershaft 11 journaled in the front frame 7 and in bracket 23. This tappet is provided with a pair of oppositely projecting pins 12 12 which revolve with the tappet and are adapted to contact with and bear upwardly against the end of a forked arm 13 which is fixed on the rock shaft 14 located between the main axle and the countershaft 11 and journaled in brackets (not shown) in front frame 7. A spring 16 between the forked arm and the tongue 8 tends to hold down the forked arm, and returns it to normal position after the pins have passed from under the ends of the forked arm. By this means the rock shaft is actuated to drop the corn through the feed mechanism (not shown) in the hoppers.

The clutch member 25 is disengaged from the fixed member 26 to throw the machine out of gear, or into inoperative position.

The countershaft 11 and its tappet wheel 10 are driven from the ground wheel A which is located beneath the tongue 8 just to the rear of the countershaft, as shown in the drawings, but it will be readily understood that these parts may be varied as to their position, when desired.

The ground wheel is supported from the tongue by the post B in which the wheel is journaled, and the post passes upwardly through an opening C in the tongue, a swivel block or bearing D being provided for the post and in which the post is reciprocally positioned. The block is partially spherical in shape and provided with a pair of trunnions E that are seated in journal openings in the tongue so that the post will be permitted a free movement within limits as the wheel A passes over rough or uneven ground, and a resiliency is given to the wheel support through the spring F interposed between the block D and a sleeve G fixed on the post. Thus, while the post and wheel are braced by the inclined arms H extended between the tongue and the lower end of the post, yet it will be apparent that the post and wheel are given a freedom of movement to compensate for rough or uneven ground. The wheel A has a sprocket wheel A' over which the sprocket chain 11ᵃ passes, and this chain also passes over the idler wheels I and J to the large sprocket 10' as seen in Fig. 1. The idler wheels are supported from the tongue by brackets K, pivoted at L and provided with springs M to draw the sprocket chain taut and allow for movement of the post and its wheel A. If desired, a plow N may be supported directly in front of the ground wheel A to clear the surface of the ground for the traveling wheel.

What we claim is:—

1. The combination with the dispensing mechanism operating shaft of a seed planter, and its slotted draft tongue, of a bearing block swiveled in the slotted tongue and a spring pressed post journaled in the block, and a ground wheel journaled in the post having connections therefrom to the dispensing mechanism.

2. The combination in a seed planter, of a feed operating shaft and its sprocket wheel, a slotted draft tongue, a bearing block swiveled in the tongue, and a spring pressed post journaled in the block, a ground wheel journaled in the post and a sprocket wheel associated with the ground wheel, a driving sprocket chain on said sprocket wheels, and flexibly supported idler wheels for the chain.

In testimony whereof we affix our signatures.

FRANK HEVEL.
GROVER C. HARRINGTON.
WILLIAM HEVEL.